Oct. 30, 1945.　　　　C. C. DAVIS　　　　2,387,981

SAFETY CHUCK KEY

Filed June 21, 1944

Inventor

Cecil C. Davis,

By Mason & Hatfield

Attorneys

Patented Oct. 30, 1945

2,387,981

UNITED STATES PATENT OFFICE 2,387,981

SAFETY CHUCK KEY

Cecil C. Davis, Bristol, Tenn., assignor of one-half to Frank J. Gobble, Bristol, Tenn.

Application June 21, 1944, Serial No. 541,411

4 Claims. (Cl. 81—90)

This invention relates to a safety tool or key for rotary chucks.

In rotary tools, such as rotary drills and the like, the tool is held by means of a chuck. The jaws of the chuck are retractable so that the tool may be removed. The retraction of the jaws of the chuck is normally obtained by rotation of a sleeve, which sleeve in turn imparts a camming action on the jaws. When a tool is withdrawn from the jaws of the chuck, and a new tool placed between the jaws, the normal procedure of tightening the jaws is to use a key which is inserted into a socket of the stationary portion of the chuck, the key having a suitable pinion gear thereon which meshes with a gear rack on the lower portion of the rotatable camming sleeve, thus rotating the sleeve relative to the chuck proper. If the workman or mechanic forgets to remove the key from the chuck, and the rotary power is transmitted to the chuck, the centrifugal action of the rotating chuck will throw the key outwardly. Such circumstances have in the past caused serious injury to workmen and have also caused considerable damage to the chuck.

The main object of this invention is to provide a combination of a rotary chuck and a key therefor wherein the key will be automatically and forcibly ejected entirely away from the chuck after the key has been used to tighten or release the jaws of the chuck.

Another object of the invention is to provide such a combination mentioned above wherein the means for automatically ejecting the entire key from the chuck is housed entirely within the key.

Another object of the invention is to provide a combined chuck and a key therefor, wherein the entire key will automatically be forcibly ejected away from the chuck after the key has been used in connection with the chuck, wherein the automatic means for so doing is housed entirely within the chuck.

Another object of the invention is to provide a safety key wherein, should the mechanic or workman fail to remove the key from the chuck after inserting a new drill or the like within the chuck, the key will automatically and forcibly eject itself so that it will be thrown outwardly from the chuck immediately after the key has been used and before the mechanic leaves his position to start the rotation of the chuck.

Another object of the invention is to provide a safety key which is formed of relatively few simple parts which may be easily and cheaply made and assembled.

Other objects will be apparent from the following specification and the accompanying drawing.

Figure 3:
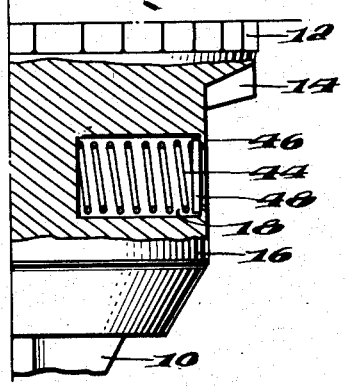

While Figure 3 is a fragmentary sectional view showing a modification of the invention.

Figure 1:
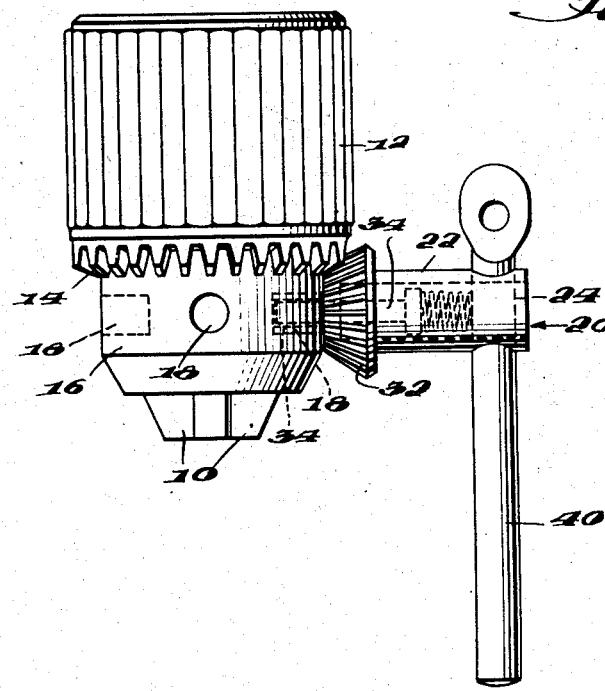
Figure 1 is a side elevational view of a rotary chuck and of the safety tool shown in operative engagement with the chuck.
Figure 2:
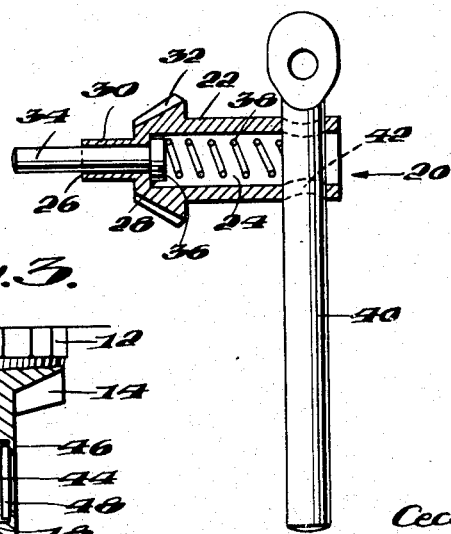
Figure 2 is a sectional view of the safety key, partly in section.

In the drawing, reference is made particularly to Figure 1 wherein 10 indicates the jaws of the chuck which are movable toward and away from each other by the knurled sleeve 12. Rotation of the sleeve 12 in one direction causes the jaws 10 to move toward each other so as to provide a suitable gripping action on a tool inserted between the jaws, while rotation in the other direction causes the jaws 10 to move away from each other, thereby permitting a tool inserted between the jaws to be retracted therefrom. The knurled sleeve 12 is provided with the usual gear rack 14 which gear rack is positioned on the under side of the sleeve 12. Reference numeral 16 indicates the portion of the chuck which is stationary relative to the sleeve 12. A plurality of sockets 18 extend through a portion of the stationary member 16, all of which is well-known and customary in the art.

Reference numeral 20 generally indicates the safety key which forms the preferred form of the invention. The tool or key 20 is formed of a shank member 22 which is hollow and cylindrical so as to leave a cylindrical bore 24 therein. A reduced cylindrical bore 26 is formed integrally of the forward end of the shank 22 and provides a shoulder 28 between the bores 24 and 26. The bore 26 is formed by a reduced shank member 30. The usual pinion gear 32 is formed integrally between the shanks 22 and 30, and is adapted to mesh with the rack gear 40 formed on the knurled sleeve 12.

A plunger 34 is adapted to fit within, and slide relative to, the bore 26, the plunger 34 having a cylindrical head 36 formed integrally with the plunger 34 on its inner end thereof. A suitable coil compression spring 38 is positioned within the bore 24 and one end of the coil spring 38 is adapted to bear against the head 26 of the plunger 34, while the other end of the coil spring 38 bears against, and is held within the bore 24, by means of a suitable handle 40 which is inserted through a suitable aperture 42 formed within the shank 22.

It should be noted that the forward end of the plunger 34 extends for a considerable distance beyond the end of the reduced shank 30, and is held in such position by means of the coil compression spring 38. When the tool or key is to be used in connection with the chuck, the plunger 34 is inserted within one of the sockets 18 of the chuck, and in order to provide a meshing engagement between the pinion gear 32 formed on the tool 20 and the rack gear 14 formed on the sleeve 12, sufficient pressure must be exerted on the tool 20 to cause the plunger 34 to be retracted within the bore 24 against the tension of spring 38. When such pressure is exerted on the tool 20, the plunger assumes the position shown in dotted lines in Figure 1. When the tool is properly positioned relative to the chuck, as shown in Figure 1, rotation of the handle 40 will cause the knurled sleeve 12 to rotate relative to the member 16, thus causing the jaws 10 to move toward or away from each other, depending upon the direction of rotation of the tool.

After a new tool has been inserted between the jaws 10, and the sleeve 12 rotated in the proper direction to cause the jaws to hold the tool firmly within the chuck, and the workman relieves the initial pressure of the key 20, the entire key will be forcibly thrown outwardly from the chuck by the spring 38 pushing the plunger 34 outwardly from the tool, thereby forcing the bevel gear 32 from disengagement with the rack gear 14. The spring should be of sufficient strength so that when the pressure on the tool 20 is relieved, the spring and plunger act with a snap action to force the entire key away from the chuck. Thus, it will be obvious that should the workman forget to remove the key from the chuck, the key will automatically act to remove itself from the chuck so that there would be no possibility of the key ever being left in the chuck to cause serious bodily injury and/or mechanical damage when the chuck is again rotated at high speeds.

The modification of the invention shown in Figure 3 utilizes the basic concept of the invention already described. In this modification, the socket formed within the stationary portion of the chuck 16 is considerably enlarged so as to house a coil compression spring 44. The socket 18 has an annular shoulder 46 at its outer end. Suitable disk 48 is positioned within the socket 18. One end of the spring 44 bears against the inner wall of the socket 18 while the other end of the spring 44 bears against the inner side of the disk 48. The annular shoulder 46 retains the assembly within the socket 18.

In the operation of the modification shown in Figure 3, the usual rigid key now commonly used in the industry is utilized. The end shank portion of the key is inserted against the disk 48 and, by exerting suitable pressure on the tool, the disk 48 is pushed inwardly against the tension of the spring 44 so that the usual bevel gear on the tool will mesh with the rack gear formed on the rotatable sleeve. Here again, should the workman forget to manually remove the usual key from the socket 18, the spring and disk assembly 44 and 48, respectively, will automatically force the entire key outwardly from the chuck. Here, again, the spring 44 should be of sufficient strength so that when the pressure on the key is relieved, the spring and disk act with a snap action to force the entire key away from the chuck.

I claim:

1. A safety key for chucks comprising, a first shank member, a first cylindrical bore within said first shank member, a gear positioned on the outer periphery of said first shank member, a second shank member secured to said first shank member and extending beyond said gear and adapted to seat within a socket of a chuck, a second cylindrical bore within said second shank member, a plunger slidably mounted within said second bore, a compression spring housed within said first bore having one end thereof bearing against said plunger for normally maintaining a portion of said plunger beyond said second shank member and permitting said plunger to be retracted within each of said bores when the key is used with the chuck.

2. A safety key for chucks comprising, a first shank member, a first cylindrical bore within said first shank member, a gear positioned on the outer periphery of said first shank member, a second shank member secured to said first shank member and extending beyond said gear and adapted to seat within a socket of a chuck, a second cylindrical bore within said second shank member, a plunger slidably mounted within said second bore, an aperture through said first shank member, a handle positioned within said aperture, a compression spring housed within said first bore having one end bearing against said plunger for normally maintaining a portion of said plunger beyond said second shank member, and the other end of said spring bearing against said handle, said spring permitting said plunger to be retracted within each of said bores when the key is used with a chuck.

3. A safety key for chucks comprising, a first shank member, a first cylindrical bore within said first shank member, a gear positioned on the outer periphery of said first shank member, a second shank member secured to said first shank member and extending beyond said gear and adapted to seat within a socket of a chuck, a second cylindrical bore within said second shank member, a plunger slidably mounted within said second bore, an aperture through said first shank member, a handle positioned within said aperture, means within said first bore for normally maintaining a portion of said plunger beyond said second shank member and permitting said plunger to be retracted within each of said bores when the key is used with a chuck, and means including said handle for maintaining said first mentioned means within said first bore.

4. A safety key for chucks comprising, a first shank member, a first cylindrical bore within said first shank member, a gear positioned on the outer periphery of said first shank member, a second shank member secured to said first shank member and extending beyond said gear and adapted to seat within a socket of a chuck, a second cylindrical bore within said second shank member, a plunger slidably mounted within said second bore, a shoulder formed between said bores, an aperture through said first shank member, a handle positioned within said aperture, a compression spring housed within said first bore having one end bearing against said plunger for normally maintaining a portion of said plunger beyond said second shank member and permitting said plunger to be retracted within each of said bores when the key is used with a chuck, and means for maintaining said compression spring within said first bore including said shoulder and said handle.

CECIL C. DAVIS.